No. 814,529. PATENTED MAR. 6, 1906.
Z. T. FURBISH.
PUSH DRILL.
APPLICATION FILED SEPT. 12, 1903.
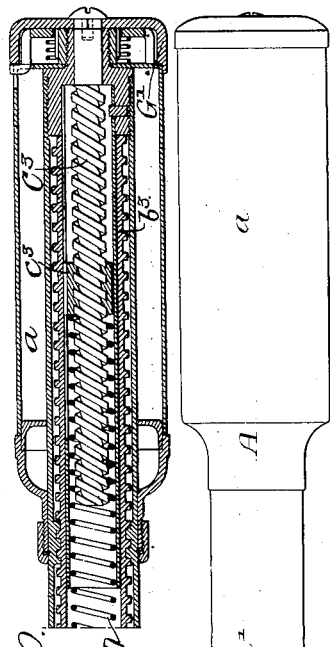
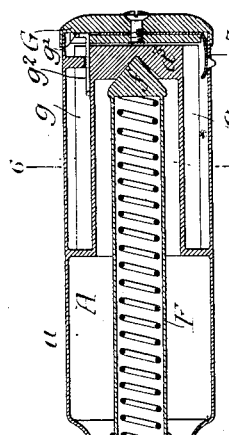
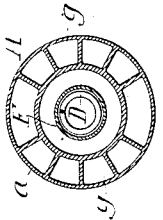
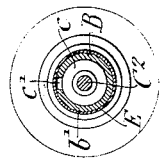
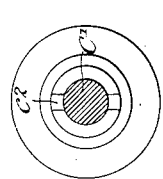
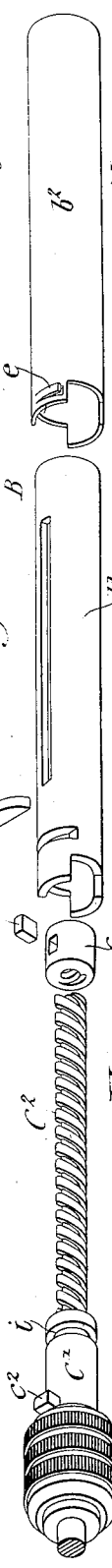
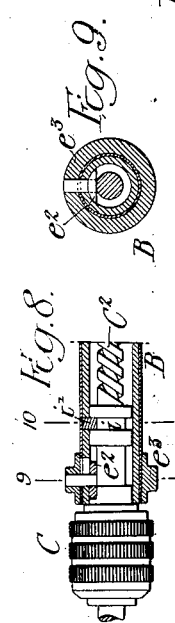
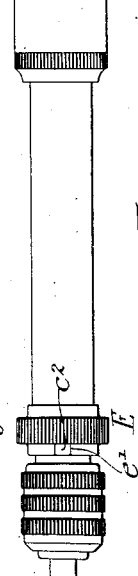
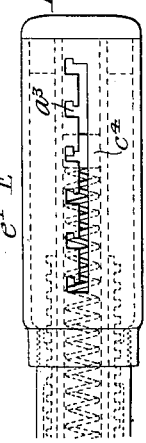
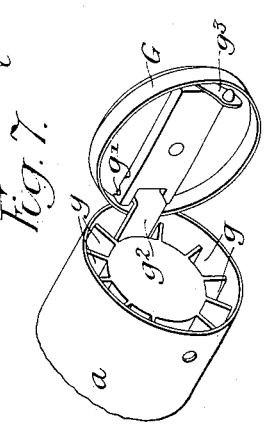
Witnesses:—
Hamilton D. Turner
Herman E. Metius
Inventor:—
Zachry T. Furbish,
by his Attorneys;
Howson & Howson

UNITED STATES PATENT OFFICE.

ZACHRY T. FURBISH, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

PUSH-DRILL.

No. 814,529.  Specification of Letters Patent.  Patented March 6, 1906.

Application filed September 12, 1903. Serial No. 172,940.

*To all whom it may concern:*

Be it known that I, ZACHRY T. FURBISH, a citizen of the United States, residing in Philadelphia, Pennsylvania, have invented certain Improvements in Push-Drills, of which the following is a specification.

The object of my invention is to adjust the spring of a push-drill so that the tension can be regulated according to the size of drill used and also according to the material to be drilled.

My invention relates also to other details, which will be fully described hereinafter.

In the accompanying drawings, Figure 1 is a side view of a push-drill, illustrating my invention. Fig. 2 is a longitudinal sectional view. Fig. 3 is a view showing some of the parts detached. Fig. 4 is a transverse sectional view on the line 4 4, Fig. 2. Fig. 5 is a transverse sectional view on the line 5 5, Fig. 2. Fig. 6 is a transverse sectional view on the line 6 6, Fig. 2. Fig. 7 is a view showing the lid of the magazine opened, and Figs. 8, 9, 10, and 11 are views of modifications.

A is a handle made in two parts $a$ and $a'$. The part $a'$ is screwed into the part $a$ in the present instance.

B is a tubular tool-carrier made in two sections $b$ and $b'$. The section $b$ has a series of spiral threads cut thereon, and on the part $a'$ of the handle is a nut $a^2$, meshing with the said threads, so that when the handle is pushed forward the nut will cause the carrier B to turn. The section $b'$ is screwed into the section $b$ and is slotted longitudinally, and mounted within this section $b'$ is a traveling nut $c$, having a tongue $c'$ extending into the slot, so that the nut cannot turn in the said section. The slot in the section $b'$ is closed by a tubular casing $b^2$.

C is the chuck of the drill, made in any suitable manner and having a shank $C'$, which enters the portion $b'$ and is held therein by a key-plate $i'$, which extends into an annular groove $i$ in the shank. Extending from the shank of the chuck C is a screw-stem $C^2$. This screw-stem passes through the nut $c$, so that when the chuck is turned independently of the carrier B it will shift the nut longitudinally to place more or less tension upon the spring D, which is mounted within the tool and is for the purpose of returning the handle after it is pushed forward and to give more or less resistance to the push.

The carrier B is locked to the chuck C by a sleeve E, which is arranged to slide on the portion $b'$ of the carrier B, a friction-spring $e$ keeping it in the place to which it is adjusted. The sleeve E is notched at $e'$, and when the notches are in line with the pins $c^2$ on the chuck the sleeve can be pushed over the pins, so that the sleeve will lock the chuck to the carrier B. Both the chuck and the carrier will then turn together.

In Figs. 8 and 9 I have shown a modification of the means for locking the chuck-section to the carrier B. The shank of the chuck is notched in this instance, and a block $e^2$ is attached to a sliding collar $e^3$ and can be moved into and out of engagement with the chuck.

In order to prevent the spring D becoming out of line when compressed, I mount a tubular section F in the handle A, and this section extends into the end of the carrier B, as shown in Fig. 2, and has its opposite end $f$ pointed. This pointed end rests in a socket in the end $a^3$ of the handle. Thus the spring is confined laterally throughout its entire length.

The section $a$ of the handle in the present instance has a series of pockets $g$, forming a tool-magazine.

G is a cap for the magazine, hinged at $g'$ to a slide $g^2$ and held in place by a spring-clip $g^3$, which has a projection which enters a hole in the casing. On depressing this spring-clip the lid can be opened and a drill of the proper size removed from the magazine.

It will be understood that in some instances the magazine-section may be dispensed with and a plain handle used, and the means for clutching the chuck to the carrier B may be modified without departing from my invention.

In Fig. 10 I have shown a modification in which the nut and screw are mounted at the handle end of the tool. In this instance the screw $C^3$ is mounted in the end of the handle and the slotted guide $b^3$ is secured to the handle. The nut $c^3$ can be adjusted longitudinally by turning the cap $G'$, which is attached to the screw, and can be locked to the handle after adjustment. This construction forms the subject of a patent granted to me on the 6th day of June, 1905, numbered 791,767.

In place of the nut for adjusting the spring I may use a sliding block $c^4$, as shown in Fig. 11, having an arm which projects through a slot $a^3$ in the casing of the handle, the slot being notched at intervals, so that the block can be adjusted and held in the adjusted position.

It will be seen that when a small drill is used or the material to be drilled is soft I can so turn the chuck that the nut will be moved to give less tension to the spring, and when a large drill is used or hard material is to be drilled then the chuck is turned so as to move the nut to its extreme inward limit, compressing the spring and placing considerable tension upon it. This prevents the breaking or bending of drills and also enables the operator to drill soft or hard material with the same tool.

I claim as my invention—

1. The combination in a push-drill of a hollow handle, a hollow drill-carrier, means whereby the carrier will be turned on the reciprocation of the handle, a spring mounted in the hollow handle and carrier and a longitudinally-adjustable abutment for said spring arranged to slide in one of said parts, substantially as described.

2. The combination in a push-drill, of a handle, a drill-carrier, a nut on one part engaging a thread on the other part, a spring mounted between the two parts, a screw-actuated abutment for said spring whereby said spring can be longitudinally adjusted, substantially as described.

3. The combination in a push-drill of a handle, a drill-carrier, means whereby the carrier will be turned on the reciprocation of the handle, a screw on one part, a nut adjustable on said screw and forming an abutment, and a spring mounted between the abutment-nut and the other part, substantially as described.

4. The combination in a push-drill, of a handle, a nut thereon, a carrier, a screw thereon engaged by the nut, a chuck mounted in the carrier, means for coupling the said chuck to the carrier, a screw on the chuck, a nut on the screw and engaging the carrier, and a spring between the last-mentioned nut and the handle of the drill, substantially as described.

5. The combination in a push-drill, of a handle, a carrier on which the handle slides, a spring for returning the handle, a chuck, a screw attached to the chuck, a nut on the screw forming one bearing for the spring so that when the chuck is turned independently of the carrier it will move the nut and adjust the spring, and means for locking the chuck to the carrier, substantially as described.

6. The combination in a push-drill, of a handle, a carrier on which the handle slides, a spring for returning the handle, a chuck, a screw attached to the chuck, a nut on the screw forming one bearing for the spring so that when the chuck is turned independently of the carrier it will move the nut and adjust the spring, a notched sleeve on the carrier, a pin on the chuck arranged to enter the notch of the sleeve, substantially as described.

7. The combination in a push-drill, of a handle, a carrier on which the handle slides, a spring for returning the handle, a chuck, a screw attached to the chuck, a nut on the screw forming one bearing for the spring so that when the chuck is turned independently of the carrier it will move the nut and adjust the spring, a notched sleeve on the carrier, a pin on the chuck arranged to enter the notch of the sleeve, and a friction-spring for retaining the sleeve in its adjusted position, substantially as described.

8. The combination in a push-drill, of a handle made in two parts, a nut on one part of the handle, a two-part carrier, a screw-thread on one part of the carrier engaging the nut on the handle, a slot in the other part of the carrier, a nut traveling in said part and having a pin entering the slot, a spring mounted in the handle and in the carrier and resting against the nut in the carrier, a casing surrounding the slotted portion of the carrier, a chuck secured to the end of the carrier and having a screw arranged to pass through the nut in the carrier, and means for locking the chuck to the carrier, substantially as described.

In testimony whereof I have signed my name to this specification in the presence of two subscribing witnesses.

ZACHRY T. FURBISH.

Witnesses:
WILL. A. BARR,
JOS. H. KLEIN.